United States Patent
Matarazzo et al.

[11] Patent Number: 6,164,886
[45] Date of Patent: Dec. 26, 2000

[54] BOLT WITH INTEGRAL LOCKING MEMBER

[75] Inventors: John C. Matarazzo, Monroeville; Ian L. W. Wilson, Murrysville; David E. Boyle, Pittsburgh; David H. Roarty; George E. Rudd, both of Murrysville, all of Pa.

[73] Assignee: Westinghouse Electric Company LLC, Pittsburgh, Pa.

[21] Appl. No.: 09/382,021

[22] Filed: Aug. 24, 1999

Related U.S. Application Data

[60] Provisional application No. 60/136,752, Jun. 1, 1999.

[51] Int. Cl.⁷ ..................................................... F16B 39/00
[52] U.S. Cl. ........................ 411/176; 411/183; 411/271; 411/972
[58] Field of Search ................................... 411/271, 325, 411/176, 177, 183, 501, 972

[56] References Cited

U.S. PATENT DOCUMENTS

| | | |
|---|---|---|
| 3,726,553 | 4/1973 | Reynolds . |
| 4,089,247 | 5/1978 | Dahl . |
| 4,448,561 | 5/1984 | Le Pargneux ............................ 411/271 |
| 4,506,418 | 3/1985 | Viola . |
| 4,683,108 | 7/1987 | Balog . |
| 4,828,441 | 5/1989 | Frasca . |
| 4,905,546 | 3/1990 | Katscher ................................. 411/271 |
| 5,076,149 | 12/1991 | Everts . |
| 5,771,266 | 6/1998 | Fabris . |

FOREIGN PATENT DOCUMENTS

| | | | |
|---|---|---|---|
| 3626338 | 2/1988 | Germany ............................... | 411/271 |

OTHER PUBLICATIONS

Christian Hillrichs, Replacement of Bolts in RPV Internals, Procedures and Performance Planning Department in the KWU Reactor Service Division, pp. 18–23, Sep. 1987.

*Primary Examiner*—Flemming Saether

[57] ABSTRACT

A high strength bolt fastens a baffle plate and a former plate of a pressurized water nuclear reactor pressure vessel together. The bolt has a head portion and an integral locking member extending from the head portion for engaging one of the structural members to lock the bolt with the structural member. The integral locking member portion has a lower yield stress than the yield stress of the shank. A lower yield stress may be obtained by selective annealing. The locking member is less susceptible to stress corrosion cracking in high temperature, high pressure water of commercial nuclear power reactors.

8 Claims, 2 Drawing Sheets

BOLT WITH INTEGRAL LOCKING MEMBER

CROSS-REFERENCE TO RELATED APPLICATIONS

This application claims the benefit of U.S. Provisional Application No. 60/136,752, filed Jun. 1, 1999.

BACKGROUND OF THE INVENTION

The invention relates to a bolt for fastening two structural members together and more particularly to a bolt having an integral locking member which may be deformed to fit with one of the structural members in order to prevent untorquing of the bolt.

In the past two decades, the commercial nuclear power industry has become concerned that bolts originally provided in reactor pressure vessels for fastening internal structural members such as plates, tubes and the like together may untorque or become subject to corrosion cracking after years of exposure to irradiation, high temperatures, high pressures, fluid flow induced vibrations and high velocity water and/or steam flows. Accordingly, the operators of some plants have tack welded the heads of the bolts to the structural members in several applications. However, welding must be very carefully performed under difficult physical conditions in order to minimize stresses and compositional variations in the weld and heat effected zones which may result in welds susceptible to stress corrosion cracking.

Replacement bolts for fastening reactor vessel internals together have been designed with locking members which are deformed (e.g., by crimping) to engage recesses machined into the sidewalls of countersunk bolt holes in the structural members for restricting the bolts. See, e.g.: U.S. Pat. No. 4,683,108 to Balog, U.S. Pat. No. 4,711,760 to Blaushild and U.S. Pat. No. 5,771,266 to Fabris which show a bolt with a separate locking member for fastening a baffle plate and a former plate in the core barrel of a pressure vessel in a pressurized water reactor; and a KWU Service Report dated September 1997 by Christian Hillrichs entitled "Replacement of Bolts in RPV Internals" which shows a bolt with an integral locking member for fastening a core shroud and a core support in a pressure vessel in a boiling water reactor. Such bolts are on the order of one half inch to about five eight inch or more in diameter by about two inches or more in length. Also, they generally are fabricated of an austenitic stainless steel (such as Type 316 or Type 347) or of a nickel alloy (such as alloy X-750). These replacement bolts may installed and deformed in submerged shutdown reactor vessels with tooling and equipment similar to that shown by the KWU Service Report and by U.S. Pat. No. 4,991,280 to Reimer et al.

The nuclear power industry prefers the use of integral replacement bolts rather than two piece bolts in order to simplify the bolt installation process. However, the locking members of replacement bolts must be designed so that they may be readily deformed by existing tooling. While integral replacement bolt designs have been successfully installed and used to fasten internal structural members of reactor pressure vessels, the nuclear power industry is concerned that deformed regions of the locking members may themselves be susceptible to stress corrosion cracking.

SUMMARY OF THE INVENTION

It is an object of the present invention to provide an integral bolt for fastening two structural members such as internals of a reactor pressure vessel and the like together with a locking member which is not as susceptible to stress corrosion cracking as prior art bolts. It is a further object to provide an integral replacement bolt having a locking member which can be substantially deformed with existing tooling.

With these objects in view, the present invention resides in a bolt for fastening two structural members together. The bolt has a head portion, preferably including a shoulder, a threaded shank extending from the bolt head portion for threadedly engaging one of the structural members, and an integral locking member extending from the bolt head portion for locking with the other structural member. The integral locking member has a lower yield stress than the yield stress of the shank. Advantageously, the deformed regions of such a locking member will be less susceptible to stress corrosion cracking.

In a preferred embodiment of the present invention, the locking member is in an annealed condition. In a preferred practice, the bolt is fabricated by machining the locking member from the head portion and then selectively annealing the locking member without annealing the head or shank, most preferably by radio frequency ("RF") induction heating. By closely controlled induction heating, the locking member may be fully or partially annealed.

In a preferred practice of the present invention, the locking member is deformed, e.g., by crimping one or more regions into recessed regions of a wall of a bolt hole in one of the structural members. In another practice, a locking member is additionally deformed in one or more intermediate regions spaced from the regions fitting with the recesses for compressively engaging the wall of the bolt hole.

In a another embodiment of the present invention, a locking member has a flared distal end or an intermediate bulge for providing an interference fit between the locking member and the structural member. Preferably, the flared end or the intermediate bulge is crimped into recesses in the wall of the bolt hole. In another embodiment, a locking member has both a flared distal end and an intermediate bulge for providing an interference fit. The locking member is preferably selectively annealed by induction heating; however, annealing may not be necessary in some applications.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
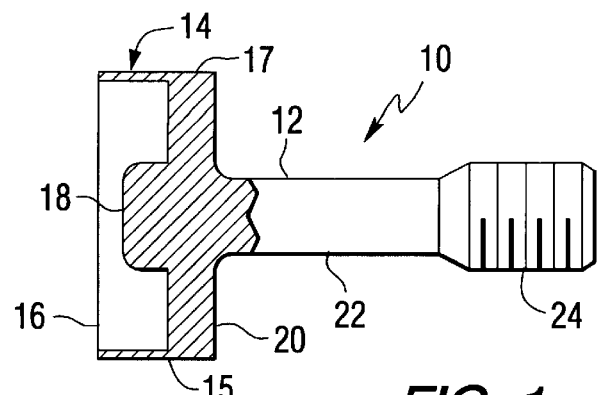
FIG. 1 is a partially sectioned view of a first embodiment of an integral bolt and locking member of the present invention.

Referring now to the drawings in detail and in particular to FIG. 1 there is shown an integral bolt/locking member 10 generally comprising a bolt 12 and a locking member 14. As shown, the locking member may have a generally cylindrical shape extending from a proximate end 15 to a distal end 16. The bolt 12 includes a head portion 17, including a hex head 18 and a shoulder 20, and a shank 22 having threads 24 extending from the head portion 17. Preferably, hex heads are employed for engaging a tightening device in order to facilitate later ultrasonic inspection of the bolt, however, other head configurations such star-type heads (not shown) or Phillips-type heads (not shown) may be alternatively employed. Preferably, the locking member 14 is machined from the head portion 17, but it may be a separate piece welded to the head portion of a bolt in other embodiments (not shown).

The integral bolt/locking member 10 is preferably fabricated of a suitable steel such as an austenitic stainless steel. Most preferably, the integral bolt/locking member bolt 10 is a high strength material fabricated of strain hardened Type 316 or Type 347 stainless steel and has a minimum yield strength of about 65,000 psi. The integral bolt 10 may also be fabricated of a nickel base alloy such as Alloy 690 or Alloy X-750 or other suitable alloy. Preferably, the locking member 14 is softened by selectively annealing, e.g., by induction heating or by other suitable means. For example, the integral bolt/locking member 10 may be held along the shank 22 and the locking member introduced into the interior portion of a RF coil. The locking member 14 may then be rapidly annealed without annealing the head portion 17, shank 22 or threads 24.

Figure 2:
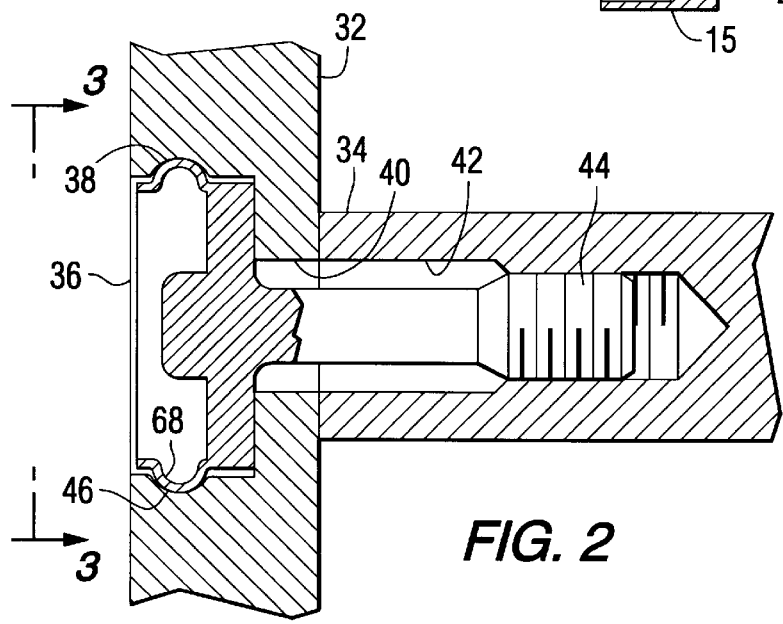
FIG. 2 is a partially sectioned view of the integral bolt and locking member of FIG. 1 fastened to two structural members in accordance with a first practice.
Figure 3:
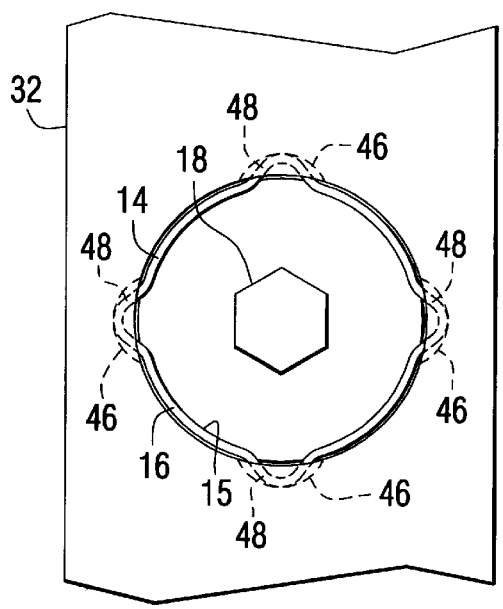
FIG. 3 is an end view of the integral bolt and locking member taken along line 3—3 of FIG. 2.

FIGS. 2 and 3 show the integral bolt/locking member 10 of FIG. 1 fastening two structural members such as a baffle plate 32 and a former plate 34 of a pressure vessel together. The integral bolt/locking member 10 extends through a bolt hole 36 including a countersunk portion 38 and adjacent bolt hole portion 40 in the baffle plate 32 and a distal bolt hole portion 42 having a threaded portion 44 in the former plate 34. As may be best seen in FIG. 3, the wall of the countersunk portion 38 of the bolt hole has four recessed regions 46 which may be machined into the baffle plate 32. In other designs (not shown) there may be from one to six or more recesses. As shown in FIGS. 2 and 3, the locking member 14 has been deformed at circumferentially spaced locations 48 by crimping to fit with the recessed regions 46 to prevent the bolt 12 from untorquing in service. Also, the head portion 17 of the bolt 12 will remain in place in the event that the bolt 12 may part as a result of stress corrosion cracking or other condition. Advantageously, soft annealed metal of the locking member 14 may be extensively deformed without generating excessive stresses.

Figure 4:
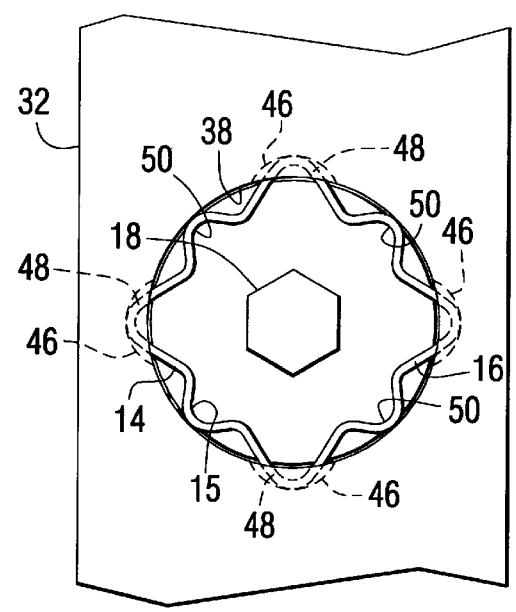
FIG. 4 is an end view similar to FIG. 3, showing a second locking design.

FIG. 4 is similar to FIG. 3, showing another locking design. In addition to the crimped regions 48 of the locking member 14 which fit with recesses 46 in the wall of the countersunk hole 38 as shown in FIG. 3, the relatively soft locking member 14 may be further deformed by providing one or more second deformed regions 50 between the crimped regions 48 which compressively engage the countersunk hole portion 38. As shown, there may be four such deformed regions 50. This design may be accomplished by torquing the bolt/locking member 10 a predetermined amount, untorquing (e.g., about an eight of a turn), crimping second deformations 50, retorquing the bolt/locking member 10 to the predetermined amount (and thereby to rotate the crimped deformations 50 out of the recesses) or to another point, and then crimping the first deformations 48.

Figure 5:
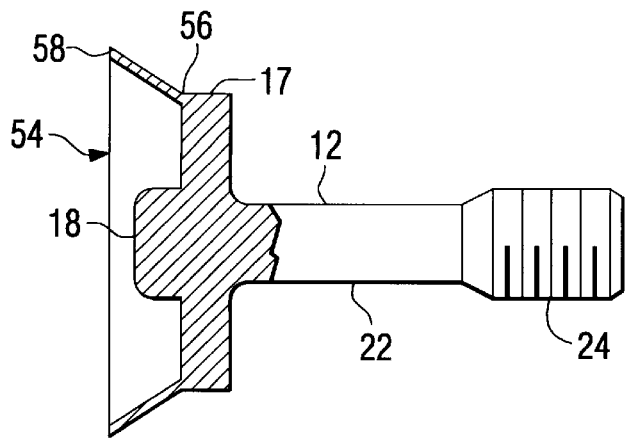
FIG. 5 is a partially sectioned view of a second embodiment of an integral bolt and locking member of the present invention.
Figure 6:
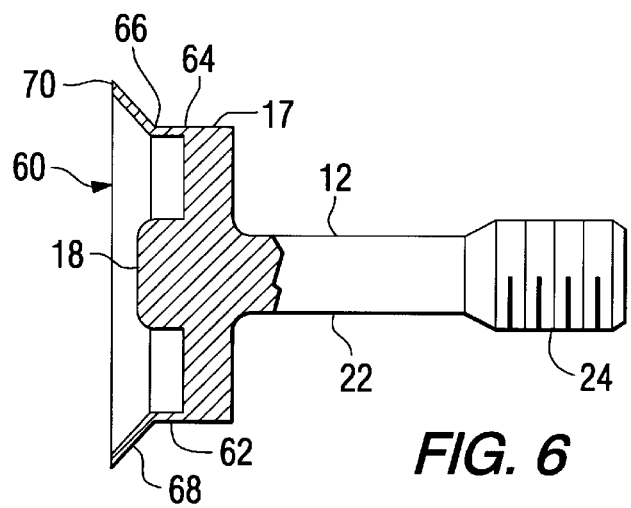
FIG. 6 is a partially sectioned view of a third embodiment of an integral bolt and locking member of the present invention.
Figure 7:
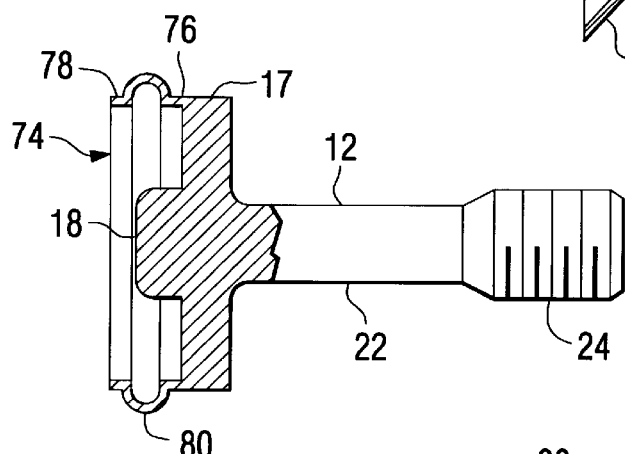
FIG. 7 is a partially sectioned view of a fourth embodiment of an integral bolt and locking member of the present invention.

FIGS. 5–8 show other integral bolt/locking member designs which are designed to provide an interference fit with the wall of the countersunk hole 38 or with recesses in the wall of the countersunk hole 38. Each design includes a bolt 12 having a head portion 17 with a hex head 18 and a shank 22 with threads 24. FIG. 5 shows a locking member 54 which has an outwardly flared wall extending from a proximate end 56 contiguous with the head portion 17 to a distal end 58. FIG. 6 shows a similar design including a locking member 60 which has a generally cylindrical portion 62 extending from a contiguous end 64 to a midwall point 66 and an outwardly flared portion 68 extending from the midwall point 66 to a distal end 70. FIG. 7 shows a locking member 74 having a generally cylindrical shape with ends 76 and 78 and an intermediate bulge 80.

Figure 8:
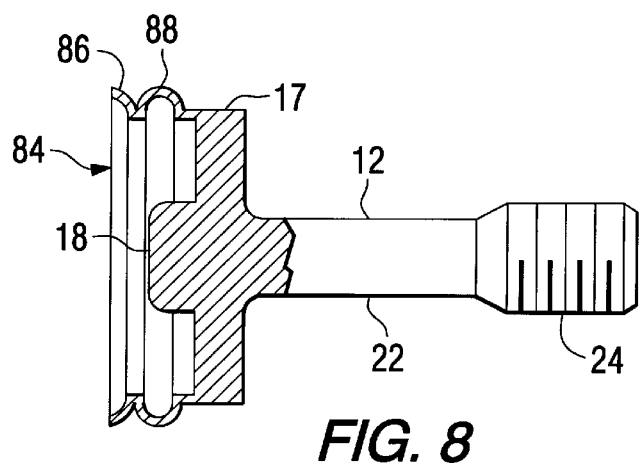
FIG. 8 is a partially sectioned view of a fifth embodiment of an integral bolt and locking member of the present invention.

FIG. 8 shows a locking member 84 having a flared distal end 86 and an intermediate bulge 88. Preferably, the bulge 80 extends 360° around the locking member. Also, more preferably, the flared end or the intermediate bulge is crimped into one or more recesses in the wall of the bolt hole. Preferably, there are four spaced apart recesses in the wall as illustrated in FIG. 4 with an intermediate bulge having crimped regions extending therein. Integral bolt/locking members with interference fits which introduce substantial compressive forces in the locking members for retaining the integral bolt/locking members in place, may be sufficiently resistant to corrosion cracking. Thus, replacement baffle bolts like those shown in FIG. 8 (and having unannealed integral locking members machined from bolt stock) with crimped intermediate bulges having interference fits of 0.012 inch on a diametral basis and flared ends having interference fits of 0.006 inch on a diametral basis have been successfully demonstrated.

While a present preferred embodiment of the present invention has been shown and described, it is to be understood that the invention may be otherwise variously embodied within the scope of the following claims of invention.

What is claimed is:

1. An alloyed bolt for fastening two structural members together comprising: a head portion; a threaded shank extending from the head portion; and an integral locking member extending from the head portion for engaging one of the two structural members to lock the bolt with the structural member, the alloy in the locking member portion having a lower yield stress than the yield stress of the alloy in the shank, wherein the bolt locking member has spaced apart first regions crimped outwardly of the bolt head and second regions crimped outwardly of the bolt head, the first crimped regions extending farther from the bolt head than do the second crimped regions.

2. The bolt of claim 1, wherein the alloy in the integral locking member has a lower yield stress than the yield stress of the alloy in the bolt head.

3. The bolt of claim 1, wherein the bolt is fabricated of an austenitic stainless steel and the threaded shank has a yield strength of at least 65,000 psi.

4. The bolt of claim 1, wherein the integral locking member is annealed.

5. The bolt of claim 1, wherein the locking member is disposed in a bore having a wall defined by a structural member and the second crimped regions of the locking member compressively engage the wall.

6. The bolt of claim 5, wherein the wall of the bore has a recess therein and the first crimped regions of the locking member extend into the recess.

7. A metallic bolt for fastening two structural members together comprising: a head portion; a threaded shank extending from the head portion; and an integral locking member extending from the head portion, the locking member portion having compressed second crimped regions and first regions crimped outwardly of the bolt head, the first crimped regions extending farther from the bolt head than do the compressed second crimped regions.

8. The bolt of claim 7, wherein the compressed regions are spaced from the first crimped regions.

* * * * *